(12) United States Patent
Bitar et al.

(10) Patent No.: US 12,151,332 B2
(45) Date of Patent: Nov. 26, 2024

(54) DENTAL BLANK AND A HOLDING DEVICE

(71) Applicant: Ivoclar Vivadent AG, Schaan (LI)

(72) Inventors: Nicola Bitar, Montlingen (CH); Felix Christanell, Naturns (IT)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 18/179,857

(22) Filed: Mar. 7, 2023

(65) Prior Publication Data

US 2023/0286090 A1  Sep. 14, 2023

(30) Foreign Application Priority Data

Mar. 8, 2022 (EP) .................................... 22160824

(51) Int. Cl.
*B23Q 3/06* (2006.01)
*A61C 13/00* (2006.01)
*B23Q 3/08* (2006.01)

(52) U.S. Cl.
CPC ............. *B23Q 3/062* (2013.01); *B23Q 3/084* (2013.01); *A61C 13/0022* (2013.01)

(58) Field of Classification Search
CPC .......... B23Q 3/062; B23Q 3/08; B23Q 3/084; A61C 13/0022
See application file for complete search history.

(56) References Cited

U.S. PATENT DOCUMENTS

| | | | |
|---|---|---|---|
| 10,080,406 B2 * | 9/2018 | Montaquila | A44C 15/0085 |
| 2018/0055612 A1 * | 3/2018 | Kadobayashi | A61C 13/0004 |
| 2018/0257187 A1 * | 9/2018 | Grobbee | B23Q 3/062 |
| 2022/0142755 A1 | 5/2022 | Lichtensteiger et al. | |
| 2022/0142756 A1 | 5/2022 | Lichtensteiger | |

FOREIGN PATENT DOCUMENTS

EP         3372191 A1    9/2018

* cited by examiner

*Primary Examiner* — Sarang Afzali
(74) *Attorney, Agent, or Firm* — Ann M. Knab; Thad McMurray

(57) ABSTRACT

A holding device (100) for a round dental blank (200). The holding device has an open ring element (101) for laterally gripping the dental blank (200) and a closing element (103) for closing the ring element (101) at various positions.

11 Claims, 6 Drawing Sheets

DENTAL BLANK AND A HOLDING DEVICE

CROSS-REFERENCE TO RELATED APPLICATIONS

This application claims priority to European Patent Application No. 22160824.3 filed on Mar. 8, 2022, the disclosure of which is incorporated herein by reference in its entirety.

TECHNICAL FIELD

The present invention relates to a holding device for a round dental blank and a method for clamping a round dental blank.

BACKGROUND

Dental blanks for the production of dental objects in dental manufacturing equipment often have production-related tolerances. For example, the diameter of circular or round dental blanks can vary. If these are arranged in conventional holding devices, they exhibit play. This leads to inaccuracies when manufacturing dental objects, for example using a milling process. In addition, when the dental blank is clamped, spalling can occur on the circular notch, which is also called chipping.

US 20220142756, 20220142755, 20180055612 are directed to holders for milling discs or round dental blanks and are hereby incorporated by reference in their entirety.

SUMMARY

It is the technical aim of the present invention to improve a holding device for a round dental blank in such a way that dental blanks with different manufacturing tolerances can be accommodated without play.

This technical problem is solved by subject-matter according to the independent claims. Technically advantageous embodiments are the subject of the dependent claims, the description and the drawings.

According to a first aspect, the technical problem is solved by a holding device for a round dental blank, with an open ring element for lateral gripping the dental blank; and a closing element for closing the ring element at various positions. The holding device achieves the technical advantage that dental blanks with different diameters can also be securely fixed in the holding device, since the ring element can always be closed under tension. When the circumference of the dental blank is larger, the closing element is closed in a larger or wider position, and when the circumference of the dental blank is smaller, the closing element is closed in a smaller or narrower position. This means that dental blanks with manufacturing tolerances can also be pretensioned and fastened without play. The holding device can adapt to the different diameters of the dental blanks.

In a technically advantageous embodiment of the holding device, the closing element comprises a tongue and a recess for inserting or engaging the tongue. The tongue can have detent elements which engage in larger detent geometries on the opposite side of the ring element. The larger detent geometries can also be used to compensate for manufacturing tolerances. This provides, for example, the technical advantage that the circumference of the ring element can be continuously varied in the range of the length of the tongue or depth of the recess. The recess or tongue can also be formed with positive or negative detent geometries that engage with corresponding opposing detent geometries.

In a further technically advantageous embodiment of the holding device, the tongue or recess comprises one or more locking geometries. The locking geometries may comprise, for example, welding ribs. This provides, for example, the technical advantage that the tongue can be effectively welded to the recess.

In a further technically advantageous embodiment of the holding device, one end of the ring element comprises a first clamping geometry for engaging a first tensioning mandrel and the other end of the ring element comprises a second clamping geometry for engaging a tensioning second mandrel. The clamping geometries can be formed as recesses into which the respective mandrel can be inserted. This provides the technical advantage, for example, that the ring element can be closed with a high tension and a pretension can be applied.

In a further technically advantageous embodiment of the holding device, the ring element comprises an adhesive gap for inserting an adhesive or a fastening gap. The adhesive gap or fastening gap may be disposed between an upper peripheral edge and a lower peripheral edge of the ring member. The adhesive may be disposed in the adhesive gap in advance, during an injection molding of the holding device.

By means of shrinkage or pre-tensioning of the ring element, the fixing points and/or contact feet can penetrate the material in a pointed configuration and thus improve the hold. In the case of hard dental blanks, these can be deformed or squeezed without penetrating the material of the dental blank. By means of the fixing points and/or the contact feet, the attachment of the holding device can be improved. This achieves, for example, the technical advantage that the holding device of the dental blank is additionally stabilized. Furthermore, this is advantageous in the case of temperature fluctuations which may occur during transport to different climatic zones. In this way, the different temperature expansion coefficients of the materials can be compensated for during temperature fluctuations.

In a further technically advantageous embodiment of the holding device, the adhesive gap comprises at least one circumferential excess trough for receiving the excess adhesive. This achieves, for example, the technical advantage that the liquid adhesive cannot ooze out of the adhesive gap.

In a further technically advantageous embodiment of the holding device, the adhesive gap comprises a first circumferential excess trough which runs adjacent to an upper circumferential edge and a second circumferential excess trough which runs adjacent to a lower circumferential edge. This achieves, for example, the technical advantage that an excess trough is arranged in front of each edge, which effectively prevents adhesive from leaking.

In a further technically advantageous embodiment of the holding device, the adhesive gap comprises several protruding fixing points. This has the technical advantage, for example, that a preliminary attachment of the dental blank can be achieved before the adhesive has cured.

In a further technically advantageous embodiment of the holding device, the fixing points are distributed along the adhesive gap and/or are arranged in the center of the adhesive gap. This achieves, for example, the technical advantage that a high pressure can be exerted on the circumference of the dental blank, through which it improves the fixation of the dental blank.

In a further technically advantageous embodiment of the holding device, the adhesive gap comprises a plurality of protruding contact feet. This provides, for example, the technical advantage of achieving better adhesion. As reducers of the adhesive gap, the contact feet increase the bonding area and produce greater rigidity.

In a further technically advantageous embodiment of the holding device, the contact feet are distributed along the adhesive gap and/or arranged in pairs. This has the technical advantage, for example, of achieving even better adhesion.

In a further technically advantageous embodiment of the holding device, the ring element comprises a hinge notch on its outer circumference. This provides the technical advantage, for example, that it can be expanded and arranged around the dental blank in a simple manner. In addition, defined expansion or opening is made possible.

In a further technically advantageous embodiment of the holding device, the hinge notch is arranged opposite the closing element. This provides, for example, the technical advantage that the ring element can be opened wide. The hinge notch can also cause elasticity of the ring element in the longitudinal direction. In this case, the ring element is always in contact with the dental blank.

In a further technically advantageous embodiment of the holding device, the ring element comprises at least one edge protection element for gripping around an edge of the dental blank. This achieves, for example, the technical advantage that damage to the edges of the dental blank can be prevented.

According to a second aspect, the technical problem is solved by a method for clamping a round dental blank with a holding device according to the first aspect. The method solves the same technical advantages as the holding device itself.

BRIEF DESCRIPTION OF THE DRAWINGS

Examples of embodiments of the invention are shown in the drawings and are described in more detail below.

DETAILED DESCRIPTION

Figure 1:
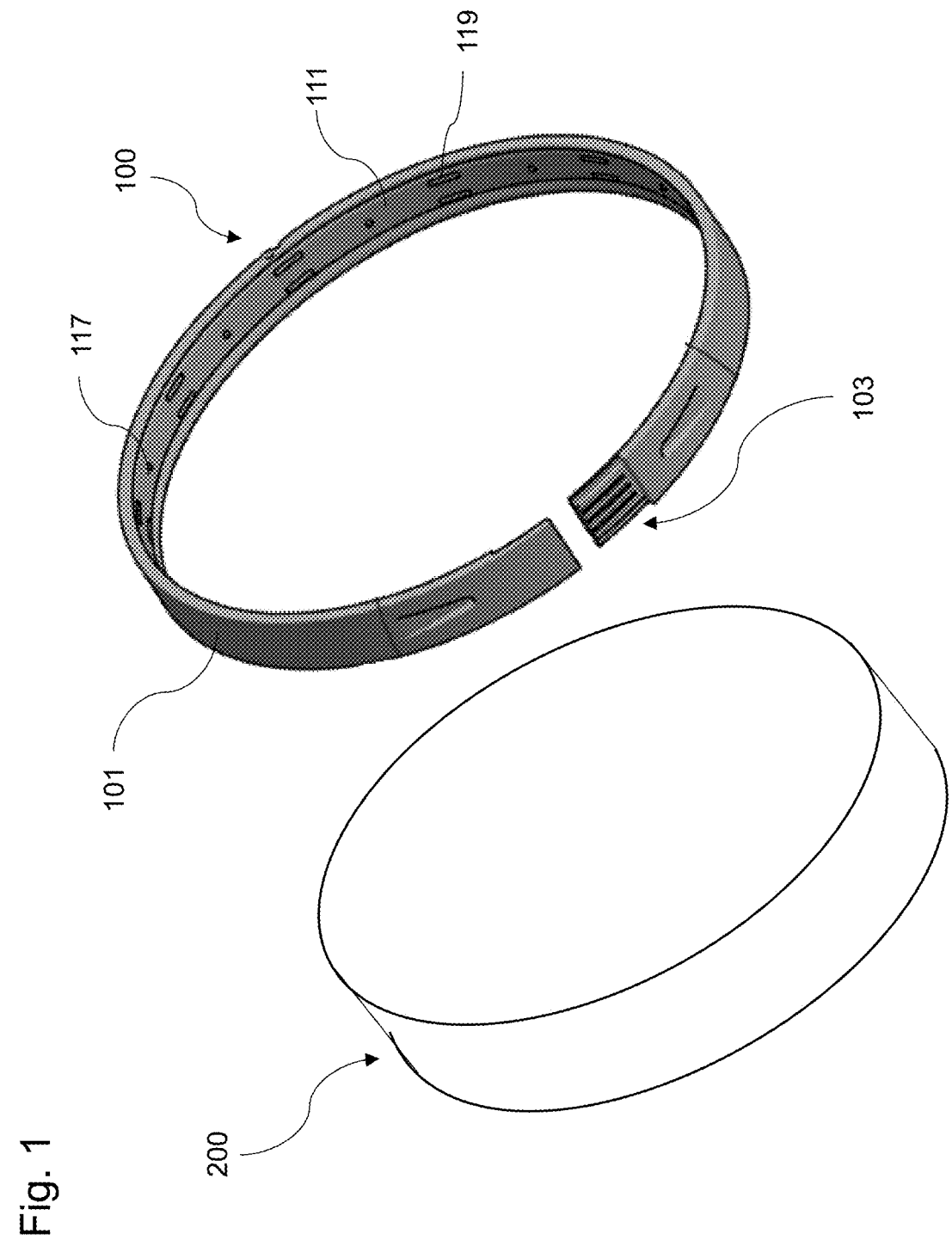
FIG. 1 shows a view of a holding device and a dental blank.

FIG. 1 shows a view of a holder or holding device 100 for a round dental blank 200. The round dental blank can be a circular disc-shaped, a cylindrical or an oval dental blank 200. The holding device is suitable for all shapes of dental blanks that can be enclosed by means of the ring or ring element 101. The holding device 100 comprises an open, belt-shaped ring element 101 for laterally embracing the dental blank 200. The edge of the ring element 101 may be rounded at the bottom and top.

In addition, the holding device 100 comprises a closure or closing element 103 for closing the ring element 101 at a plurality of positions. The holding device 100 may be formed of a strong, tough thermoplastic material such as, but not limited to, polyamide (PA12). The dental blank 200 is a circular disk-shaped blank, fabricated of a material such as but not limited to, high strength composites or ceramics, such as, but not limited to zirconium oxide and lithium disilicate, from which dental objects can be milled.

By closing the ring element 101 at different positions, it can be ensured that the ring element 101 is always tightened around the dental blank 200 with sufficient pretension. For smaller dental blanks 200, the ring element 101 is closed at a narrower position or has a smaller diameter in comparison to larger dental blanks. For larger dental blanks 200, the ring element 101 is closed at a wider position or has a larger diameter in comparison to smaller dental blanks.

The ring element 101 comprises along its length an adhesive gap 111, into which a liquid adhesive is introduced. The adhesive additionally bonds the holding device 100 to the dental blank 200. The adhesive gap 111 additionally comprises tapered and protruding fixing points 117 that abut the side surface of the dental blank 200. The adhesive may be a liquid polymer that cures with atmospheric moisture. It may also be provided an attachment gap 111, which increases the elasticity of the ring element 101 and is used to attach the holding device 100. Further, the adhesive gap or the attachment gap 111 comprises contact feet 119, which are arranged at the same height as the outer walls of the ring element 101.

Optimized adhesion is obtained by the elongated contact feet 119. As adhesive gap thinners, the contact feet 119 increase the bonding area and create greater rigidity of the ring element 101. Due to the contact feet 119, an immediate adhesion can be achieved as fast as possible.

Figure 2:
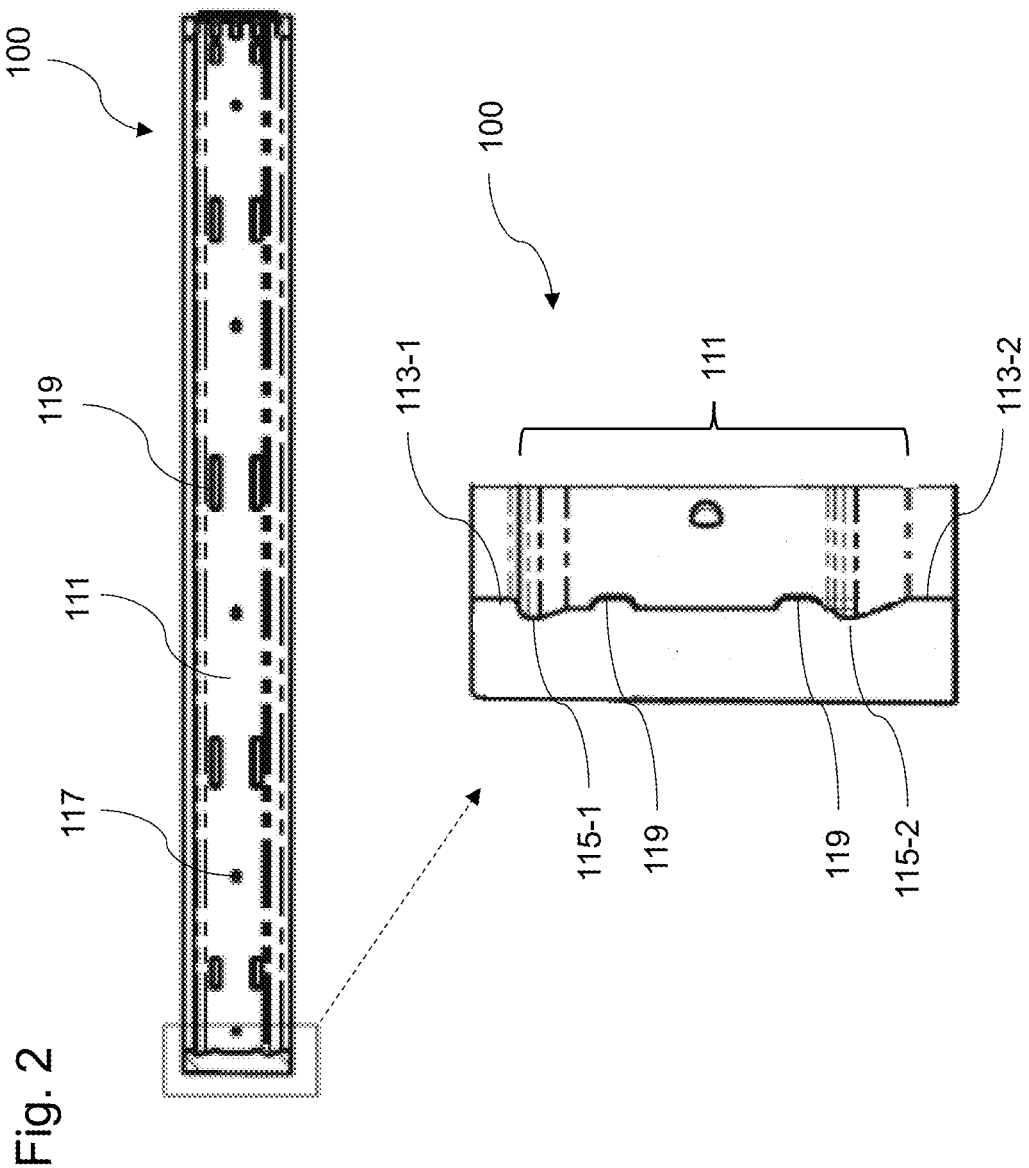
FIG. 2 shows a cross-sectional view through the holding device.

FIG. 2 shows a cross-sectional view through the holding device 100. The adhesive gap 111 for receiving the adhesive extends between an upper circumferential edge 113-1 and a lower circumferential edge 113-2 of the ring element 101. The adhesive gap 111 has, for example, a depth of 0.2 mm and is arranged in the center of the ring element 101. Surface of the adhesive gap 111 can be roughened so that the adhesive adheres better. This can be achieved by a sandblasted surface of an injection molded part.

An upper circumferential excess channel or trough 115-1 extends adjacent to an upper circumferential edge 113-1, and a lower circumferential excess trough 115-2 extends adjacent to a lower circumferential edge 113-1. The excess troughs 115-1 and 115-2 absorb excess adhesive so that it cannot leak out of the adhesive gap 111. For example, the excess trough has a depth of 0.4 mm and thus a level 0.2 mm lower than the adhesive gap 111.

The ring element 101 preferably comprises tapered fixing points 117 in the center of the adhesive gap 111. The fixing points 117 prevent the holding device 100 from slipping until the adhesive has cured. The fixing points 117 are distributed along the adhesive gap 111 and have, for example, a projection of 0.1 mm. The fixing points 117 are pressed against the disc of the dental blank 200 and deformed or penetrate the dental blank 200 when the ring element 101 is attached. In this way, a pretension is applied to them. The fixing points 117 prevent slippage during subsequent processing steps, such as printing, labeling or packaging.

Figure 3:
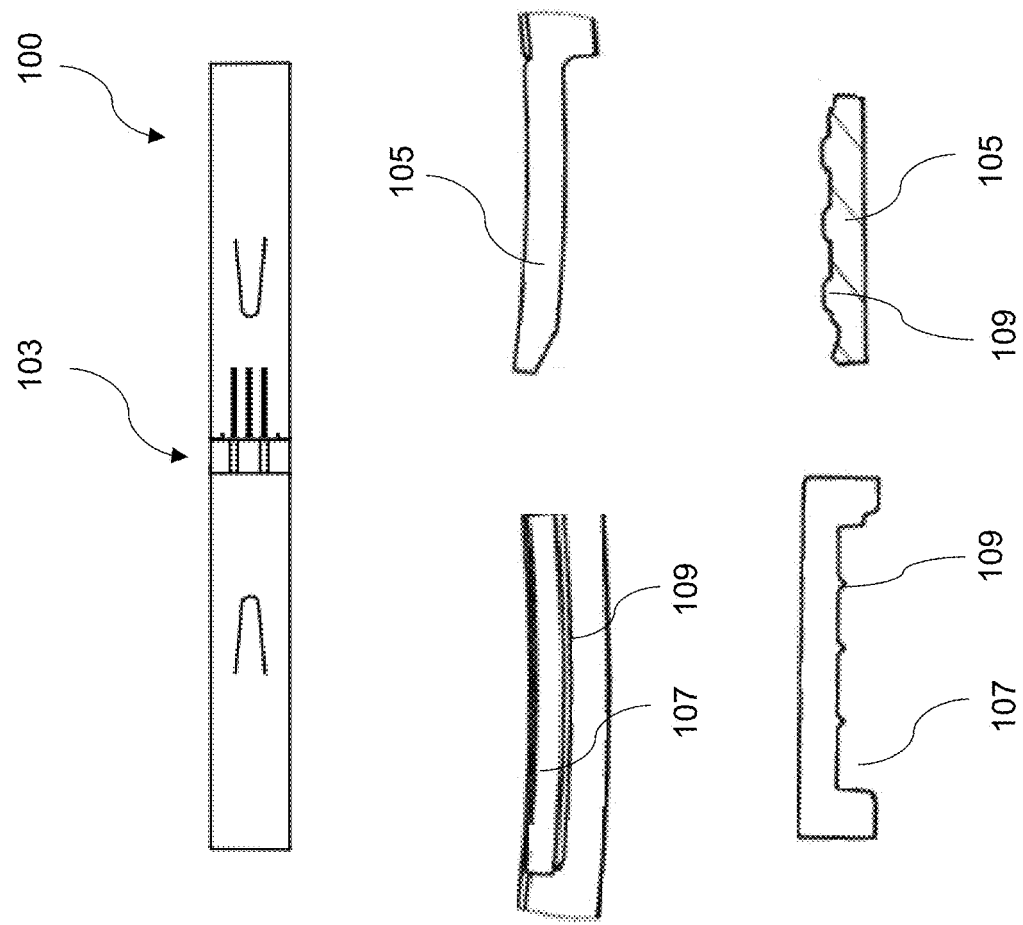
FIG. 3 shows multiple views of a closing element.

FIG. 3 shows several views of a closing element 103. Elevations and depressions interlock. The ring element 101 includes an opening for attaching the holding device 100 to the dental blank 200.

For closing the ring element 101, the ring element 101 comprises a closing element 103 provided with an overlap at which the two ends of the ring element can be welded together. The overlap is formed by a tongue 105 arranged at one end of the ring element 101, and a recess 107 for insertion of the tongue 105 arranged at another end of the ring element 101. The tongue 105 can be continuously pushed into the recess 107. In this way, the holding device 100 can be continuously closed at numerous positions to adapt to the diameter of the dental blank 200. Depending on the position, a different inner diameter of the holding device 100 is thereby achieved.

Beside bonding, the ring element 101 can be fixed to the dental blank 200 by means of shrinkage, i.e. without adhesive. The holding device 100 can be fixed by means of an adhesive bond and/or shrinkage.

To improve welding, the overlap at the tongue 105 and that of the recess 107 has raised welding ribs 109. The elongated welding ribs extend in the insertion direction of the tongue 105 and the recess 107. The welding ribs, as a possible closure geometry 109, create defined contact areas between the tongue 105 and the recess 107 where material can be selectively melted using an ultrasonic welding process to join the two ends of the ring element 101 together. The closing element can also be closed by means of a hot stamping process or a quick bonding process. The overlap provided by the closing element 103 is such that it is possible to wrap around dental blanks 200 having different diameters. The overlap during welding is, for example, 4 to 6 mm.

Figure 4:
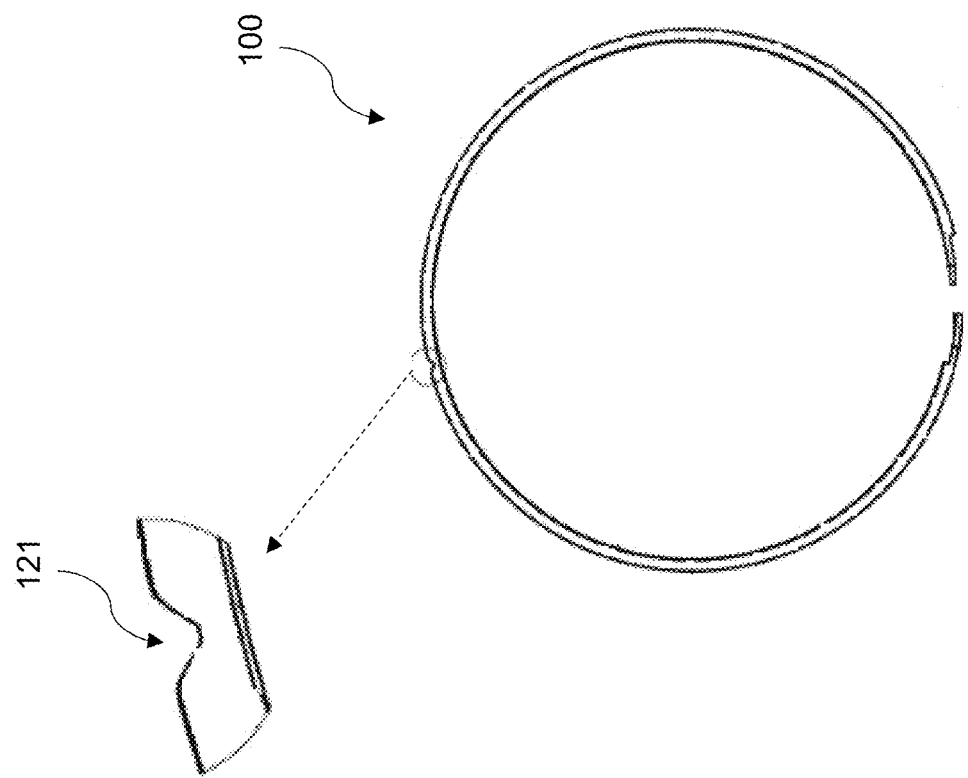
FIG. 4 shows a view of a hinge notch.

This can result in a front gap on the weld side of 1 mm for small dental blanks 200 and a front gap of 4 mm for large dental blanks 200. To prevent visibility of the dental blank 200, two additional overlaps can be applied at the weld site. FIG. 4 shows a view of a hinge notch 121. The hinge notch 121 is formed by a V-shaped recess in the ring element 101 and allows the ring element to be bent in a hinge-like manner. This allows the ring element 101 to be opened and placed around the dental blank 200. The hinge notch 121 enables a defined expansion of the ring element 101. The hinge notch 121 is arranged opposite the closing element 103.

Figure 5:
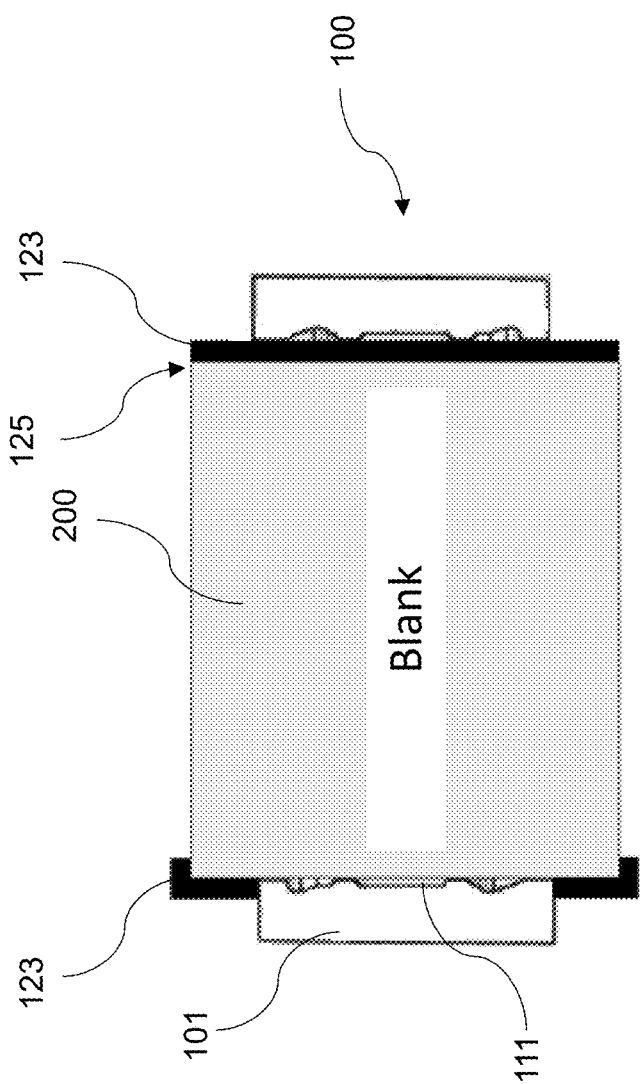
FIG. 5 shows a cross-sectional view through the holding device.

FIG. 5 shows a cross-sectional view through the holding device 100. The holding device 100 includes an edge protection element 123 for protecting or gripping around an edge 125 of the dental blank 200. The angled or straight edge protection element 123 extends from the ring element 101.

Figure 6:
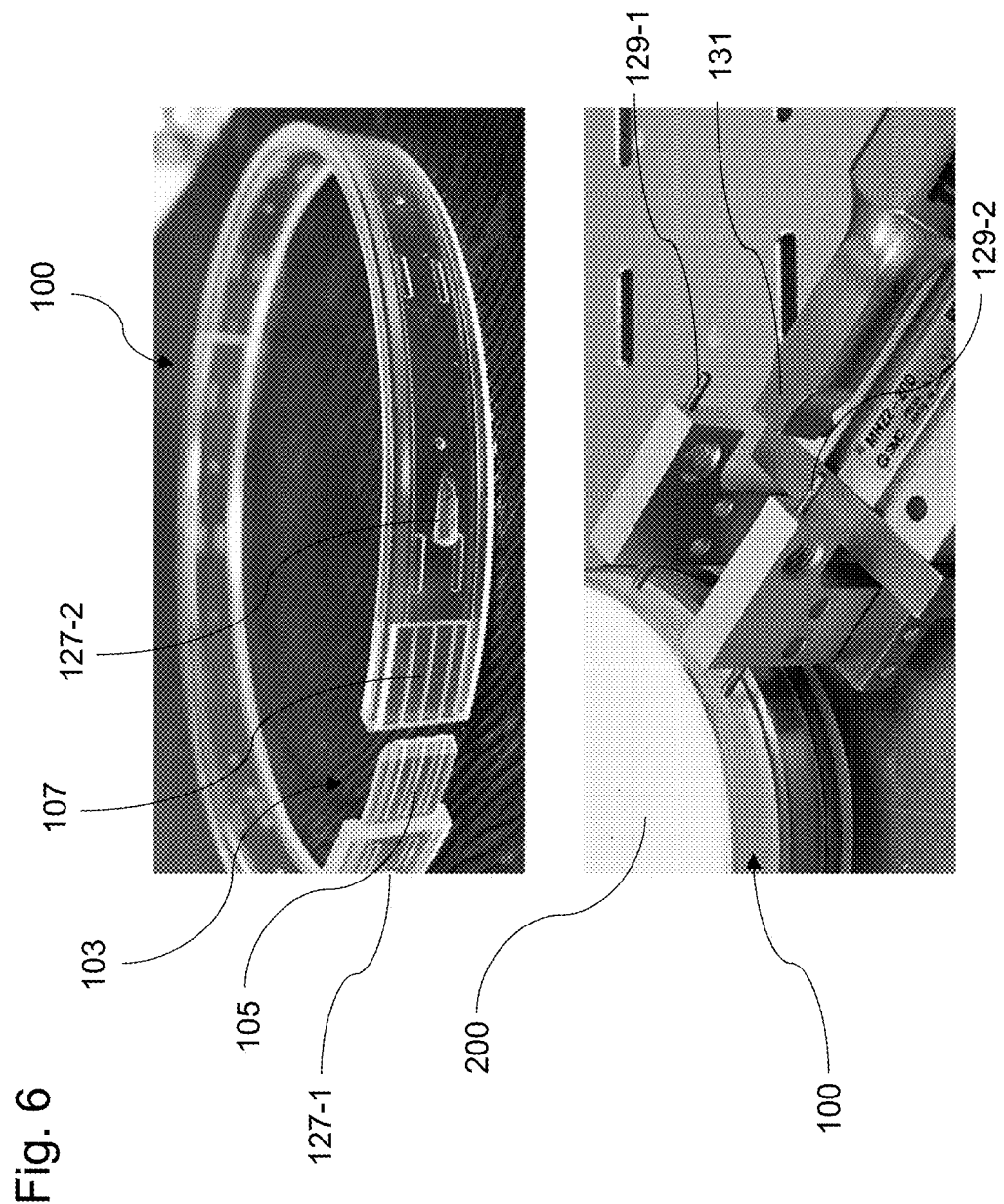
FIG. 6 shows a view of a closing device for closing a closing element.

FIG. 6 shows a view of a closing device 300 for closing a closing element 103 with a tongue 105. The adhesive is applied radially to the dental blank 200 by means of an application device before the ring element 101 is attached. In doing so, the dental blank 200 turns around and the adhesive is applied. In this case, the advantage is that the adhesive does not come into contact with the user after application of the ring element 101. Furthermore, no adhesive feed channels are necessary.

The closing device 103 has a system for pressing-on the ring element 101. The system tightens the ring element 101 onto the dental blank 200 with a force. The closing device 103 can apply a defined force to the ring element 101 via a cylinder and a reinforcement spring. To transmit the force, one end of the ring element 101 includes a first clamping geometry 127-1 for engaging a first tensioning mandrel 129-1 and the other end of the ring element 101 includes a second clamping geometry 127-2 for engaging a second tensioning mandrel 129-2. The clamping geometries 127-1 and 127-2 are formed, for example, as recesses or indentations in the ring element 101. The clamping geometries 127-1 and 127-2 allow the ring pretension to be precisely adjusted. The clamping geometries 127-1 and 127-2 can be arranged in different configurations, such as angular, rectangular, round, or oval, at a suitable location radially circumferentially on the ring element 101 or on the edges of the ring element 101. The clamping geometries 127-1 and 127-2 can be used to apply tension to the ring element 101 by means of a tool during closing, so that the ring element 101 can be closed with a pretension.

The pre-tensioning can be carried out precisely by applying a compressed air pressure to the cylinder of the pre-tensioning device. The measurement of the pre-tensioning force can be performed using a load cell. By varying a compressed air pressure, the tensioning force of the ring element 101 can be applied to different degrees.

Once the ring element 101 is tensioned, the overlapping closing element 103 is closed by means of ultrasonic welding, hot stamping or instant adhesive. For this purpose, an ultrasonic welding head 131 is pressed onto the closing element 103. This heats and fuses the closing element 103. The welding is not visible from the outside. The adhesion of the weld can be realized with simple welding parameters and is above the required adhesion. An overlap is made at the welding point so that the dental blank 200 cannot be seen from the front.

All of the features explained and shown in connection with individual embodiments of the invention may be provided in different combinations in the subject-matter of the invention to simultaneously realize their beneficial effects.

All method steps can be implemented by means which are suitable for executing the respective method step. All functions that are executed by the objective features can be a method step of a method.

The scope of protection of the present invention is given by the claims and is not limited by the features explained in the description or shown in the figures.

REFERENCE SIGNS

100 Holding device
101 Ring element or ring
103 Closing element or closure
105 Tongue
107 Recess
109 Closure geometry/welding ribs
111 Adhesive gap/fixing gap
113 Edge
115 Excess trough
117 Fixing point
119 Contact feet
121 Hinge notch
123 Edge protection element or edge protector
125 Edge
127 Clamping geometry
129 Tensioning mandrel
131 Ultrasonic welding head
200 Dental blank

The invention claimed is:

1. A round dental blank (200) and a holder (100) for the round dental blank (200) combination, the combination comprising:
a round dental blank (200); and
a holder (110);
wherein the holder comprises an open ring (101) for laterally gripping the dental blank (200) and a closure (103) for closing the ring (101) at various positions;
wherein one end of the ring (101) comprises a first clamping geometry (127-1) for engaging a first tensioning mandrel (129-1) and the other end of the ring (101) comprises a second clamping geometry (127-2) for engaging a second tensioning mandrel (129-2);
wherein the ring (101) comprises an adhesive gap (111) for inserting an adhesive; and wherein the adhesive gap (111) comprises a plurality of protruding fixing points (117).

2. The holder (100) according to claim 1, wherein the closure (103) is formed by a tongue (105) and comprises a recess (107) for inserting or engaging the tongue (105).

3. The holder (100) according to claim 2, wherein the tongue (105) or recess (107) comprises one or more closure geometries (109).

4. The holder (100) according to claim 1, wherein the adhesive gap (111) comprises at least one circumferential excess trough (115-1, 115-2) for receiving the excess adhesive.

5. The holder (100) according to claim 1, wherein the adhesive gap (111) comprises a first circumferential excess trough (115-1) extending adjacent an upper circumferential edge (113-1) and a second circumferential excess trough (115-2) extending adjacent a lower circumferential edge (113-1).

6. The holder (100) according to claim 1, wherein the fixing points (117) are at least one of (i) distributed along the adhesive gap (111) and (ii) are arranged in a center of the adhesive gap (111).

7. The holder (100) according to claim 1, wherein the adhesive gap (111) comprises a plurality of protruding contact feet (119).

8. The holder (100) according to claim 7, wherein the contact feet (119) are at least one of (i) distributed along the adhesive gap (111) and (ii) arranged in pairs.

9. The holder (100) according to claim 1, wherein the ring (101) comprises a hinge notch (121) on an outer circumference.

10. The holder (100) according to claim 9, wherein the hinge notch (121) is arranged opposite from the closure (103).

11. The holder (100) according to claim 1, wherein the ring (101) comprises at least one edge protector (123) for gripping around an edge (125) of the dental blank (200).

* * * * *